United States Patent
Wilding et al.

(10) Patent No.: US 9,560,061 B2
(45) Date of Patent: Jan. 31, 2017

(54) MOTOR VEHICLE WITH A DRIVING BEHAVIOR WHICH CAN BE MODIFIED AT A LATER STAGE USING AN APPLICATION PROGRAM

(71) Applicant: AUDI AG, Ingolstadt (DE)

(72) Inventors: Werner Wilding, Walting (DE); Thomas Kraeuter, Gaimersheim (DE); Walter Schmidt, Rennertshofen (DE); Joerg Michael, Ingolstadt (DE); Martin Schuessler, Koesching (DE); Johannes Landgraf, Gaimersheim (DE); Rainer Stahlmann, Hepberg (DE); Malte Moeller, Regensburg (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/768,571

(22) PCT Filed: Feb. 14, 2014

(86) PCT No.: PCT/EP2014/000407
§ 371 (c)(1),
(2) Date: Aug. 18, 2015

(87) PCT Pub. No.: WO2014/127897
PCT Pub. Date: Aug. 28, 2014

(65) Prior Publication Data
US 2016/0006752 A1      Jan. 7, 2016

(30) Foreign Application Priority Data
Feb. 22, 2013    (DE) .................. 10 2013 003 040

(51) Int. Cl.
*G06Q 40/08* (2012.01)
*H04L 29/06* (2006.01)
(Continued)

(52) U.S. Cl.
CPC ......... *H04L 63/1416* (2013.01); *G05D 1/0274* (2013.01); *H04L 63/0245* (2013.01);
(Continued)

(58) Field of Classification Search
CPC ..... B60K 35/00; G07C 5/0866; G07C 5/0891; H04L 63/1416; H04L 63/06; H04L 63/0245; G06Q 40/08; G06Q 10/00; G06Q 40/00; G06Q 50/24; B60N 2/002; H04W 4/046; H04B 17/3912; G08G 1/04
(Continued)

(56) References Cited

U.S. PATENT DOCUMENTS 6,714,894 B1 *  3/2004  Tobey .................... G06Q 40/00
                                                         702/182
7,295,903 B2   11/2007  Siebel et al.
(Continued)

FOREIGN PATENT DOCUMENTS

DE    20014381    11/2000
DE    10123475    11/2002
(Continued)

OTHER PUBLICATIONS

Office Action mailed Apr. 12, 2016 in Chinese Patent Application No. 201480009820.5.
(Continued)

*Primary Examiner* — Yuri Kan
(74) *Attorney, Agent, or Firm* — Staas & Halsey LLP

(57) ABSTRACT

A motor vehicle has a processor device to run application programs in a first communication zone and a storage device for vehicle control data, by which a driving behavior of the motor vehicle is determined. The storage device is arranged in a second communication zone of the motor vehicle. In order to allow a modification of the vehicle control data at
(Continued)

a later stage using an application program and thus provide protection against an undesired manipulation of the vehicle control data, the first and the second communication zones are coupled by a monitoring device that forwards new data, which an application program is attempting to transmit from the first communication zone into the second communication zone, to the second communication zone only if the monitoring device has detected that the new data leads to a safe motor vehicle driving behavior defined by a specified safety criterion.

14 Claims, 2 Drawing Sheets

(51) Int. Cl.
  *H04W 4/04* (2009.01)
  *G05D 1/02* (2006.01)
  *H04L 29/08* (2006.01)

(52) U.S. Cl.
  CPC ........... *H04W 4/046* (2013.01); *H04L 63/067* (2013.01); *H04L 63/068* (2013.01); *H04L 67/12* (2013.01)

(58) Field of Classification Search
  USPC .... 709/224; 705/3, 4; 703/8; 701/29.1, 41.5, 701/33.4, 26; 340/521, 439; 702/188; 726/6
  See application file for complete search history.

(56) References Cited

U.S. PATENT DOCUMENTS

| | | | | |
|---|---|---|---|---|
| 8,903,593 | B1* | 12/2014 | Addepalli | H04W 4/046 |
| | | | | 701/29.1 |
| 9,315,195 | B2* | 4/2016 | Armitage | B60K 35/00 |
| 2001/0016789 | A1 | 8/2001 | Staiger | |
| 2003/0117298 | A1 | 6/2003 | Tokunaga et al. | |
| 2006/0190648 | A1 | 8/2006 | Larisch et al. | |
| 2007/0226694 | A1 | 9/2007 | Neufeld et al. | |
| 2007/0271079 | A1* | 11/2007 | Oguchi | H04B 17/3912 |
| | | | | 703/8 |
| 2008/0255888 | A1* | 10/2008 | Berkobin | G06Q 40/08 |
| | | | | 705/4 |
| 2009/0027188 | A1* | 1/2009 | Saban | B60N 2/002 |
| | | | | 340/521 |
| 2009/0212928 | A1 | 8/2009 | Aijaz | |
| 2010/0098095 | A1 | 4/2010 | Kato et al. | |
| 2011/0218701 | A1 | 9/2011 | Ric et al. | |
| 2011/0258435 | A1 | 10/2011 | Bellur et al. | |
| 2012/0029764 | A1* | 2/2012 | Payne | G07C 5/0866 |
| | | | | 701/33.4 |
| 2012/0177061 | A1 | 7/2012 | Stählin et al. | |
| 2012/0191476 | A1* | 7/2012 | Reid | G06Q 50/24 |
| | | | | 705/3 |
| 2013/0104186 | A1 | 4/2013 | Dietz et al. | |
| 2013/0138460 | A1* | 5/2013 | Schumann, Jr. | G06Q 40/08 |
| | | | | 705/4 |
| 2013/0190967 | A1* | 7/2013 | Hassib | G06Q 10/00 |
| | | | | 701/31.5 |
| 2013/0212659 | A1* | 8/2013 | Maher | H04L 63/06 |
| | | | | 726/6 |
| 2013/0311641 | A1* | 11/2013 | Chow | G08G 1/04 |
| | | | | 709/224 |

FOREIGN PATENT DOCUMENTS

| | | |
|---|---|---|
| DE | 10307342 | 9/2004 |
| DE | 102005028663 | 12/2006 |
| DE | 102006045785 | 3/2007 |
| DE | 102005060902 | 6/2007 |
| DE | 102010029482 | 12/2010 |
| DE | 102010008816 | 8/2011 |
| DE | 10 2013 003 040.4 | 2/2013 |
| EP | 1058220 | 12/2000 |
| EP | 1309132 | 5/2003 |
| WO | PCT/EP2014/000407 | 2/2014 |

OTHER PUBLICATIONS

German Office Action for German Priority Patent Application No. 10 2013 003 040.4, issued Jan. 8, 2014, 7 pages.
International Search Report for PCT/EP2014/000407, mailed on Jul. 4, 2014, 3 pages.
"White Paper Towards a Secure Automotive Platform," secunet, Aug. 31, 2009, 16 pages, downloaded on Aug. 3, 2015 from http://www.secunet.com/fileadmin/user_upload/Download/Printmaterial/englisch/sn_Whitepaper_Secure_Automotive_Platform_E.pdf.
WIPO English language translation of the International Preliminary Report on Patentability for PCT/EP2014/000407, downloaded from WIPO website on Oct. 15, 2015, 6 pages.

* cited by examiner

MOTOR VEHICLE WITH A DRIVING BEHAVIOR WHICH CAN BE MODIFIED AT A LATER STAGE USING AN APPLICATION PROGRAM

CROSS REFERENCE TO RELATED APPLICATIONS

This application is based on and hereby claims priority to International Application No. PCT/EP2014/000407 filed on Feb. 14, 2014 and German Application No. 10 2013 003 040.4 filed on Feb. 22, 2013, the contents of which are hereby incorporated by reference.

BACKGROUND

The invention relates to a motor vehicle. The motor vehicle has a communication device for wireless data transmission between firstly the motor vehicle and secondly a vehicle-external appliance and/or another motor vehicle. By way of example, not limitation, the communication device may be a mobile radio module or a car-2-X or car-2-car communication module. Furthermore, a processor device is provided in the motor vehicle, to execute application programs. In this case, the application programs can interchange data using the communication device.

Such a vehicle is vulnerable to computer viruses and other "malware", which can be transferred to the motor vehicle from outside and are then executed by the processor device as part of an application program or as independent malware.

This is particularly critical in the case of a motor vehicle that is meant to be capable of accomplishing driving tasks autonomously or at least semiautonomously (in piloted fashion). In this context, driving tasks are the longitudinal guidance and/or the transverse guidance of the motor vehicle. A driving task may comprise automatic refueling or parking, for example. Another aspect is the automated accomplishment of tasks relating to payment after a refueling operation, for example, by online payment. In the years to come, an increase in such automated accomplishment of tasks by a motor vehicle can be expected. Drive-by-wire systems are also becoming increasingly available, i.e. the brakes and the steering are operated independently of the mechanics by an electronic controller. The control signals from the controllers are influenced by characteristic maps, sensors and software.

Motor vehicles of the type described are particularly susceptible to manipulation by a malicious application program. Influence from outside means that functions in the drive components and in the sensors can become flawed. There is then the associated danger to other road users and also to passengers of the motor vehicle in question. Malware can consciously influence the vehicle behavior, can spy out personal data from the passengers and can access control loops or characteristic maps from outside and thus also influence a drive-by-wire system, for example.

In this connection, DE 101 23 475 A1 discloses a multimedia system for a motor vehicle that has a vehicle computer on which software for the interaction of the vehicle components with peripheral devices is installed. In logical isolation therefrom, an application computer is provided that allows a user to access external multimedia services, to which end the application computer executes appropriate applications, i.e. application programs. The isolation between the vehicle computer, which has access to controllers and other components of the vehicle-internal network, and the application computer, which is in contact with the outside world, is provided by a firewall. The vehicle computer and the application computer can interchange data via this firewall if this is permitted by a corresponding filter rule of the firewall.

The application computer with the application programs, which communicate with external data services, forms a first communication zone, for which particular rules apply for the data interchange with the external data services. The vehicle computer with the controllers networked thereto on the other side of the firewall forms a second communication zone, which is reached from outside the motor vehicle only through the firewall. A disadvantage of using a firewall is that it does not protect against malware that manages to manipulate in the first communication zone an application program that is registered in the firewall as a permitted application program. A firewall also does not protect against operating errors, that is to say, for example, when a mechanic in a workshop uses a harmless application program to access the vehicle computer in the second communication zone through the firewall, for example in order to reconfigure a controller. If a configuration error is made in this case, this may likewise result in an undesirable driving behavior for the motor vehicle without this having been able to be prevented by the firewall.

In connection with car-2-car communication, that is to say data interchange with another motor vehicle, there is the danger that this other motor vehicle will, e.g. owing to a faulty transmission unit, transmit safety-relevant misinformation to the ego motor vehicle, such as a futile command during an overtaking maneuver, as a result of which the ego motor vehicle will sometimes immobilize itself.

SUMMARY

One possible object relates to providing protection against undesirable manipulation in the case of a motor vehicle whose driving behavior can be subsequently influenced by an application program or even via a data connection by a vehicle-external appliance and/or another motor vehicle.

The inventors propose a motor vehicle that has a communication device for wireless data transmission between firstly the motor vehicle and secondly a vehicle-external appliance, e.g. a programming appliance in a workshop or a server on the Internet, and/or another motor vehicle. By way of example, not limitation, the communication device may be a mobile radio module or a car-2-X or car-2-car communication module. The proposed motor vehicle contains two communication zones. From the first communication zone, application programs that are executed therein by a processor device can interchange data with a vehicle-external appliance and/or another motor vehicle using a communication device. By way of example, the processor device may thus comprise an infotainment system that executes application programs, e.g. for the navigation, and in so doing receives current traffic data from the Internet, for example. The data are transmitted wirelessly, i.e. the aforementioned communication device may be a mobile radio module, a Bluetooth interface, an NFC interface (NFC—nearfield communication), a WLAN interface (WLAN—Wireless Local Area Network), a WiFi interface or a car-2-X communication unit, for example.

In isolation from the first communication zone, a memory device for vehicle control data, that is to say data that stipulate a driving behavior for the motor vehicle, is provided in a second communication zone of the vehicle. By way of example, such vehicle control data may be map data for a characteristic map for a controller, such as an engine controller or a drive-by-wire controller. Parameter values for configuring a sensor, for example, may also be included. Vehicle control data are also understood to mean commands from other vehicles that have been received as part of a car-2-car communication and are intended to be forwarded to a command memory of a controller in the second communication zone.

According to the proposal, the two communication zones are now, however, not isolated from one another by a firewall that permits an application program from the first communication zone to access the vehicle control data in the memory of the second communication zone whenever the application program is authorized. Instead, the motor vehicle has provision for the first and second communication zones to be coupled via a monitoring device, for example a microcontroller or an ASIC (ASIC—Application Specific Integrated Circuit), which is designed to check the transmitted data itself. Thus, it is not the sender of the data, i.e. the application program, but rather the content of the data that is checked. Whenever an application program attempts to transmit new data from the first communication zone to the second communication zone, the monitoring device forwards these new data to the second communication zone only if the monitoring device recognizes that the new data result in a safe driving behavior for the motor vehicle. To this end, an appropriate safety criterion is prescribed in the monitoring device. In other words, only such data as meet the safety criterion are forwarded to the second communication zone.

The proposed motor vehicle has the advantage that new data are immediately themselves checked for consistency or plausibility regardless of the sender. The motor vehicle thus protects itself against a system state that could give rise to a dangerous driving behavior. Therefore, the motor vehicle itself is even protected against an operating error when a service mechanic wishes to use a permitted application program to write incorrect vehicle control data to the memory in the second communication zone in error.

Accordingly, the second communication zone preferably extends to such components of the motor vehicle as are necessary for a driving mode of the motor vehicle. In that case, the monitoring device protects all those vehicle control data that, although they are intended to be protected against undesirable alteration, on the one hand, are still meant to be alterable even after manufacture of the motor vehicle, when the motor vehicle is in the possession of an end user, on the other hand. In other words, the memory device for the vehicle communication data is all those memory areas that are in the different components.

By way of example, the components may thus be one or more of the following: a driving-safety-relevant controller, a controller for driving dynamics control, a map memory for such a controller, a sensor, an onboard power supply system for supplying power, a drive-by-wire controller, a controller for a piloted and/or autonomous journey.

The safety criterion according to which the monitoring device checks the new data may be embodied in many and varied ways. It is dependent on what type of data is checked with it.

In this case, one development of the motor vehicle provides for the new data to be compared with at least one framework characteristic map stored in the vehicle. In other words, the new data need to be in a predetermined range of values. The margins of this range of values are stipulated by one or more framework characteristic maps. If a user then attempts to use a map memory in the second communication zone to store new data that, when used as vehicle control data, would result in a control value outside a range defined by the at least one characteristic map, the transmission of this new data to the second communication zone is blocked by the monitoring device. This embodiment has the advantage that a user still has relative freedom in defining a profile for a characteristic map without putting his own safety or the safety of other road users at risk or else damaging a component of the motor vehicle as a result of operation with incorrect vehicle control data.

By contrast, particularly good protection against unwanted alteration is obtained when the motor vehicle stores a plurality of preinstalled, selectable characteristic maps. The monitoring device then functions as a virtual switch. In other words, the new data do not define arbitrary new vehicle control data in this case. Instead, the monitoring device takes the new data as a basis for enabling one or more of the preinstalled characteristic maps, as a result of which they are activated for use as vehicle control data in the motor vehicle.

A particularly flexible way of using new data to stipulate the driving behavior of the motor vehicle is obtained in an embodiment in which the monitoring device is designed to take the new data as a basis for first of all performing a simulation for a driving behavior that results from the new data. A user can then transmit arbitrary new data from the first communication zone to the second communication zone by an application program. The monitoring device then uses a simulation to check whether these data are plausible. In this case, the new data are forwarded, that is to say stored as new vehicle control data in the memory device of the second communication zone, only if a reliable driving behavior is obtained in accordance with a predetermined plausibility criterion. A plausibility criterion that needs to be taken as a basis in this case is naturally dependent on which vehicle control data are actually altered. At this juncture, a person skilled in the art can resort to knowledge that is existent in connection with the simulation of operation of a controller.

In a development of the motor vehicle, a further communication zone is provided, that is to say a third communication zone. The third communication zone is coupled to the first communication zone likewise via the monitoring device. The third communication zone contains a memory for vehicle-related and/or person-related secret data, as are used for an online payment and/or for an online service, for example. In this case, the monitoring device protects against unauthorized data access from the first communication zone to these secret data in the third communication zone. To this end, the monitoring device is designed to permit the data access from the first to the third communication zone only with a valid authentication code. This results in advantageous assistance for a user of the motor vehicle as a result of secured identification for transactions and online services, that is to say automated payment for fuel at a filling station, for example. The authentication code is preferably an anonymized code that does not allow the identity of the operator to be inferred.

To this end, the monitoring device may be designed to stipulate the authentication code on the basis of a TAN method (TAN—transaction number), for example. A mobile variant, what are known as mobile TANs, can also be used in this case, these being generated and then delivered to the user, e.g. by SMS (Short Message Service), only when needed.

The monitoring device may firstly be designed to receive the authentication code from an operator via an application program executed in the first communication zone. In other words, an infotainment system of the motor vehicle, for example, can be used to request a PIN (Personal Identification Number) or even a TAN.

However, so as also to allow an external data service to, for example, debit money from an account of the user of the motor vehicle in automated fashion, for example because said user has refueled at a filling station, the monitoring device may advantageously secondly be designed to receive the authentication code from the Internet, for example, for an external appliance using the communication device, that is to say without any action by the user in the motor vehicle.

So that the authentication code cannot be misused after it has been spied out by a piece of malware, for example, the monitoring device is preferably designed to change the authentication code after one use or after a particular period of time has elapsed.

As already explained, the inventors also propose a method. This method is used to monitor action in vehicle control data that stipulate a driving behavior for the motor vehicle. The method comprises the processing performed by the monitoring device in order to check the new data between the first and second communication zones. Upon recognition of an attempt to transmit new data from the first to the second communication zone the monitoring device checks the new data for whether use of the new data as vehicle control data results in a safe driving behavior for the motor vehicle that is defined by a safety criterion. The transmission by the monitoring device is permitted only if the new data meet this safety criterion.

The developments of the method have features that have already been described in connection with the developments of the motor vehicle. For this reason, the corresponding developments of the method are not described again at this juncture.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
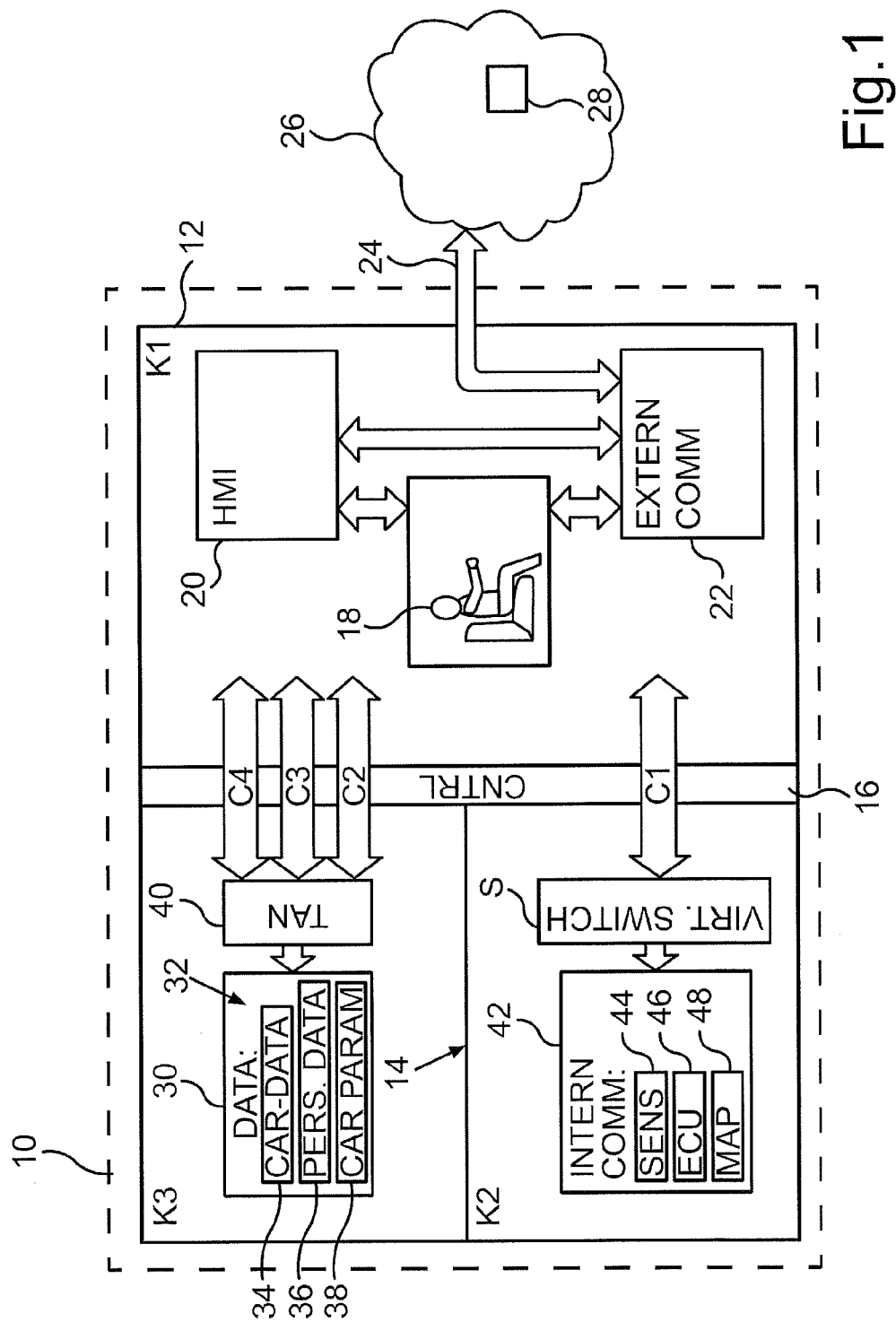
FIG. 1 shows a schematic representation of the logical structure of a data network of a potential embodiment of the proposed automobile.

Reference will now be made in detail to the preferred embodiments of the present invention, examples of which are illustrated in the accompanying drawings, wherein like reference numerals refer to like elements throughout.

In the case of the exemplary embodiments explained below, the described components of the embodiment are each individual features that can be considered independently of one another, that each also develop the proposals independently of one another and that therefore can also be regarded as part of the proposals individually or in a combination other than that shown. Furthermore, the embodiments described can also be augmented by further instances of the features that have already been described.

FIG. 1 schematically shows a data network 12 from a motor vehicle 10. In the example shown, the data network 12 is divided into three different communication zones K1, K2, K3. Each communication zone is distinguished in that data interchange between control programs of controllers, application programs or logic circuits themselves within a respective communication zone K1, K2, K3 is effected freely in each case, i.e. without additional monitoring by further controllers. The communication within one of the communication zones K1, K2, K3 is thus controlled by the applications themselves.

Each communication zone can comprise both circuit components and programs in this case. One of the communication zones K1, K2, K3 may be one or more computers or controllers, for example, that are networked among one another via a data bus or an Ethernet for example. Alternatively, components of two communication zones may be implemented within a single computer. If one application program is executed in one of these communication zones and a second application program is executed in a second of these communication zones, for example, then in a manner that is known per se it is possible for the virtual environment, as are possible as a virtualization of operating systems, for example, then these two application programs can be logically isolated from one another, which then likewise results in division to the two communication zones. An example of this is the "VMware"® product from the company of the same name.

By contrast, free data interchange is not possible between the communication zones. In the example shown in FIG. 1, direct communication between the communication zones K2 and K3 is even completely prevented by a communication boundary 14. In other words, there is no communication link, such as a communication cable that could be used to interchange data between the communication zone K2 and the communication zone K3. However, the communication zone K1 is connected both to the communication zone K2 and to the communication zone K3 via a monitoring device 16. This allows data interchange—explained in more detail below—between these communication zones, said data interchange taking place not freely but rather in monitored fashion.

For example, the communication zone K1 can contain a human/machine interface (HMI) or interface 20, for short, of the motor vehicle 10, as may be implemented by an infotainment system and an associated screen, for example. A driver 18 can use the interface 20 to use the inherently known data services of the motor vehicle 10, that is to say listening to the radio, navigation, operating convenience electronics, for example. The communication zone K1 may also contain a communication unit 22 for data interchange with the vehicle environment (EXTERN COMM). By way of example, the communication unit 22 can comprise a car-2-X communication unit, a cellphone, a WLAN communication module or a WiFi communication module. The communication unit 20 can be used to provide particularly a data connection 24 to the Internet 26. This allows data interchange between application programs of the communication zone K1 and an external data server of the Internet 26, that is to say an Internet server 28. In this case, the motor vehicle 10 is shielded from unauthorized access via the data connection 24 from outside by inherently known, conventional protection protocols, the precise implementation of which is not the subject matter of this discussion and therefore not described here, however.

By way of example, the communication zone K2 can comprise the vehicle-internal communication network 42 (INTERN COMM), by which sensors 44 (SENS), controllers 46 (ECU) and map memories 48 (MAP) are connected to one another. Naturally, the components 44, 46, 48 are then themselves also part of the communication zone K2 as well. Each of the components 44, 46, 48 can comprise a memory of their own for vehicle control data. Appropriate storage of suitable control data allows the operating behavior of the components 44, 46, 48 to be altered. In the case of the motor vehicle 10, this is also possible subsequently after the motor vehicle 10 has already been delivered to a user.

In order to alter the operating behavior, provision may be made for a map memory 48, for example, to store a plurality of different characteristic maps for setting the driving behavior of the motor vehicle 10, but for just one of these characteristic maps to be currently active. A virtual switch S (VIRT. SWITCH) can then change over between these characteristic maps and thereby alter the driving behavior of the motor vehicle 10. By way of example, such a characteristic map may be an engine control characteristic. By changing between two different characteristics, it is then possible to alter the actuating behavior of an engine controller of the motor vehicle 10. In this case, the changeover by the virtual switch S can be effected by an appropriate control command. By way of example, the control command is sent to the virtual switch S from the Internet server 28, for example, via the data connection 24 by an automobile manufacturer following appropriate purchase of a driving dynamics package. By way of example, the virtual switch S can comprise a program module that can mark the current characteristic map as invalid and the selected characteristic map as the new valid characteristic map in the map memory 48.

As soon as an attempt is made to transmit this control command from the communication zone K1 to the communication zone K2, this is again recognized by the monitoring device 16 and then a check is first of all performed to examine whether changeover to a valid characteristic is required. For example, the monitoring device 16 recognizes a changeover command as valid when it has been sent by an authenticated Internet server 28.

Only when the monitoring device 16 has verified the validity of the changeover command is the changeover command forwarded to the virtual switch S. In precisely the same way, sensors 44 and controllers 46 can store a plurality of parameter sets, between which it is then possible to change over by the virtual switch S, which can then comprise appropriate program modules or logic circuits for these components 44, 46.

The communication zone K3 can contain a memory device 30 that can store secret data (DATA) that are interchanged with the Internet server 28, for example, only with the consent of the user 18 or only if the Internet server 28 has been authorized beforehand. By way of example, the secret data may comprise the vehicle identity number 34 (CAR DATA), personal data 36 (PERS DATA), such as an account number, and parameter values for the current vehicle state 38 (CAR PARAM). In the example shown, the secret data 32 can be accessed only from the communication zone K1 when a correct TAN 40 has been input by the accessing application or by the user 18. This is checked by the monitoring device 16. To this end, the monitoring device 16 may be implemented by a microcontroller, an ASIC or else by a program module, for example, via which the data traffic is routed between the communication zone K1 and the communication zone K3.

In principle, the design described for the data network 12 prevents control commands and/or malware from gaining direct access to the controllers 46, sensors 44 and characteristic maps 48 of the motor vehicle 10. The communication zones K1, K2, K3 result in different levels of the desired and protected communication inside and outside the motor vehicle 10. This prevents access from outside the motor vehicle 10 resulting in the motor vehicle 10 being shut down (what is known as failsafe control), for example, and/or in ongoing influence on the driving behavior.

In order to prevent a piece of malware from being inadvertently provided with undesirable access to one of the communication zones K2 or K3 indirectly, individual instances of application may be divided into action categories, so that for each action category a separate communication strategy can be provided. Particular consideration is preferably given to the following instances of application: the piloted/autonomous journey of the motor vehicle 10 (automatic longitudinal and/or transverse guidance by a controller), the remote control of the vehicle, for example as part of a call function within a parking garage and the automated parking/removal of the motor vehicle in/from a parking space, automated charging and refueling operations, a payment function for services (refueling or obtaining information data from the Internet 26), the Internet access for loading vehicle-related program enables and application programs, the Internet access for loading infotainment-related programs and content, car-2-X functionalities.

Figure 2:
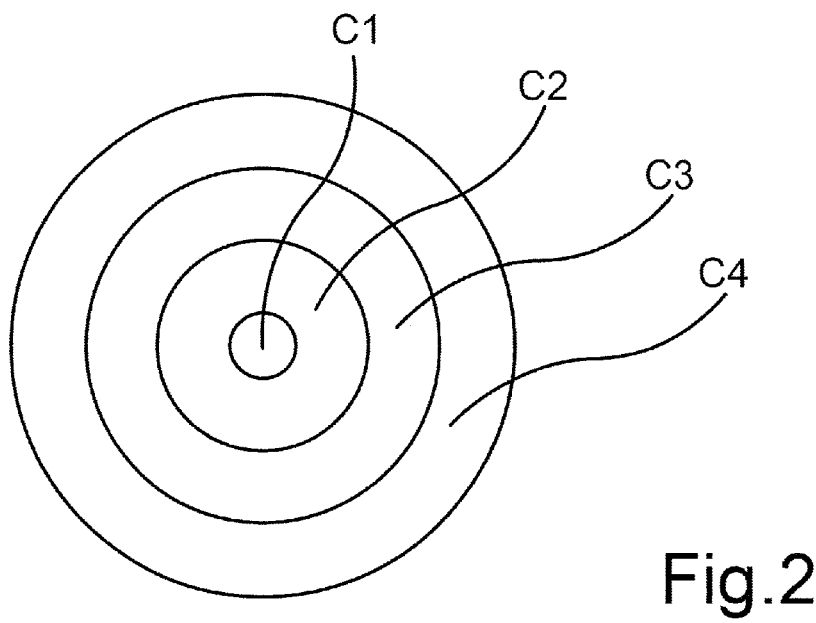
FIG. 2 shows an outline to illustrate different categories into which application programs of the automobile from FIG. 1 can be divided.

The four categories that follow, for which FIG. 2 has also been provided for illustration, have been found to be suitable action categories. A first action category C1 comprises the actual vehicle control that determines the driving behavior of the motor vehicle 10. This action category C1 relates to those data and control commands whose protection needs to be greatest. Otherwise, the safety of the passengers and of the other road users is put at risk. A next action category C2 relates to the interchange of vehicle data, as may be part of the secret data 32, that is to say the vehicle data 24 and the vehicle parameters 38. A further action category C3 relates to the interchange of personal data and the vehicle identification. Finally, an action category C4 may be provided in which relates the interchange of data services relating to data, such as Internet services, without this requiring the identity of the user 18, of the motor vehicle 10 or even control data from the memory device 32. This action category C4 requires least protection.

As FIG. 1 shows, application programs from the different action categories are transferred to different communication zones K2, K3 within the vehicle whenever they wish to access their data. By way of example, if an application program from the action category C2 (interchange of vehicle data), which application program is executed by the interface 20 in the communication zone K1, for example, wishes to access the actual critical data 34, 38 relating to the vehicle, it needs to access the memory device 30 in the communication zone K3. In this case, it is then monitored by the monitoring device 16. To this end, the monitoring device 16 is installed between the communication zone K1 and the other communication zones K2, K3 in the manner described. In this case, the task of the monitoring unit 16 varies depending on the communication zone K2, K3. The task relating to the transmission to the communication zone K3 or from the latter relates to the enabling of data access as soon as a TAN 40 between the motor vehicle 10 and a service provider, for example the Internet server 28, has been subjected to a positive consistency check. With regard to the communication zone K2, it is possible to ensure, by way of example, that new map data that have been received by the motor vehicle 10 are checked for consistency with characteristic maps that are filed, i.e. stored, in the motor vehicle 10. If this consistency check clearly results in an inconsistency, i.e. the new map data can give rise to control values outside an admissible range for the control of the automobile 10, these new map data are not stored in the communication zone K2.

The communication zone K1 is the least secured communication zone. In this case, direct access, for example by the user 18, to the vehicle functions that are provided within the communication zone K1 is possible. The user 18 can activate these functions, as is customary today, by a preselection, for example using the interface 20, for example by pushing physical switches or by selecting an appropriate menu item.

The communication zone K2 contains all of the sensors, controllers, the onboard power supply system and further components that are needed for the driving mode of the motor vehicle 10. Particularly in the case of drive-by-wire technology or the piloted/automated guidance of the motor vehicle 10, this area forms the heart of the dependability of the motor vehicle 10. This communication zone K2 accommodates safety-relevant controllers and the required characteristic maps.

The communication zone K3 is preferably provided with data for tasks that are connected to services and the interchange of secret data 32 that is therefore necessary, that is to say automated payment, charging the motor vehicle 10 with electric power and refueling, for example. The personal data 36 provided in this context may also be access data for an account, for example, which may be provided exclusively for an automated payment transaction for refueling or charging. This then does not require the user to store his personal account data from his actual checking account in the memory device 30.

With regard to the requesting of the TAN 40, one possible implementation is that this is performed in a similar manner to in the case of known online banking. In other words, the motor vehicle manufacturer, for example, can provide secured substitution of TAN for the motor vehicle 10 for safe identification. The use of TAN and similar authorization mechanisms has the additional advantage that the identification is anonymous and can be used for all payments and services. After a particular TAN has been used or after a particular period of time has elapsed after the authorization of a TAN, the motor vehicle 10 preferably changes to the next free TAN.

The virtual switch S results in additional self-protection by the motor vehicle 10 against incorrect control data. When an action is approved by the monitoring device 16, new data thus move from the communication zone K1 to the communication zone K2. There thus nevertheless exists no direct access to the map memory 48 or the other parameter memories of the sensors 44 and controllers 46, for example. It is thus not possible for arbitrary and hence possibly also erroneous vehicle control data to be stored in the components 44, 46, 48. Instead of direct access in order to load new characteristic maps or change existent characteristic maps, the virtual switch S enables only such characteristic maps as have been installed in the communication zone K2 beforehand, for example by the motor vehicle manufacturer or by a specialized company. Thus, even if there is inadvertent changeover to an incorrect set of vehicle control data, these are still vehicle control data that have been expertly checked by the motor vehicle manufacturer or the specialized company.

The proposed motor vehicle isolates important functions and control commands from access from outside the motor vehicle. The motor vehicle 10 assists the operator 18 by secured identification for transactions and services. If a motor vehicle manufacturer provides different extensions, for example additionally purchasable driving dynamics packages in the form of extended characteristic maps for the motor vehicle control, these can be safely installed or activated in the motor vehicle 10 when the motor vehicle 10 is manufactured or else retrospectively. They nevertheless cannot be intentionally or accidentally manipulated such that an unsafe driving behavior for the motor vehicle 10 is obtained. Overall, this is achieved, in principle, by virtue of any access in the communication zone K3 needing to be confirmed by the user 18 (enabling by TAN/PIN input), for example, and the new data being plausiblized in connection with the communication zone K2. This can be accomplished in the manner described by storing selectable characteristic maps or else by virtue of a simulation of the newly received program, which simulation can then recognize the effects on the vehicle control. Only if the simulation yields a plausible driving behavior is the virtual switch S then changed over to the new data.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A motor vehicle comprising:
   a communication device to perform wireless data communication with a device outside the motor vehicle, the device outside the motor vehicle being at least one of a vehicle-external appliance and another motor vehicle;
   a processor device to execute application programs in a first communication zone, to perform data interchange between the application programs and the device outside the motor vehicle using the communication device;
   a memory device for vehicle control data that stipulate a driving behavior for the motor vehicle, the memory device being arranged in a second communication zone of the motor vehicle; and
   a monitoring device to couple the first and second communication zones to monitor new data, which one of the application programs attempts to transmit from the first communication zone to the second communication zone, to recognize whether the new data result in a safe driving behavior for the motor vehicle that is defined by a prescribed safety criterion, and to forward the new data to the second communication zone only if the new data result in the safe driving behavior, wherein the motor vehicle has at least one property selected from a group consisting of:
   the motor vehicle stores a plurality of preinstalled, selectable characteristic maps and the monitoring device takes the new data as a basis for enabling and activating at least one of the preinstalled characteristic maps for use as vehicle control data in the motor vehicle,
   the monitoring device performs a simulation for a driving behavior that results from the new data and forwards the new data only if the simulation shows that an admissible driving behavior is obtained in accordance with a predetermined plausibility criterion, and
   the motor vehicle contains a third communication zone, which is coupled to the first communication zone via the monitoring device, the third communication zone having a memory to store secret data, the secret data being at least one of vehicle-related secret data and person-related secret data, the secret data being for at least one of an online payment and an online service, the monitoring device permitting data access from the first communication zone to the third communication zone only with a valid authentication code.

2. The motor vehicle according to claim 1, wherein
the monitoring device compares the new data with at least one framework characteristic map stored in the motor vehicle, and
the monitoring device blocks transmission of the new data if the new data, when used as vehicle control data, would result in a control value outside an admissible range defined by the at least one framework characteristic map.

3. The motor vehicle according to claim 1, wherein the second communication zone comprises a component that is coupled to the memory device and that controls a driving mode of the motor vehicle.

4. The motor vehicle according to claim 3, wherein the component is at least one component selected from a group consisting of: a driving-safety-relevant controller, a controller for driving dynamics control, a map memory for the driving-safety-relevant controller, a sensor, an onboard power supply system for supplying power, a drive-by-wire controller, and a controller that controls automatic driving properties.

5. The motor vehicle according to claim 1, wherein
the motor vehicle contains the third communication zone, which is coupled to the first communication zone via the monitoring device, the third communication zone having the memory to store secret data, the monitoring device permitting data access from the first communication zone to the third communication zone only with a valid authentication code, and
the monitoring device receives the valid authentication code from an operator via one of the application programs executed in the first communication zone.

6. The motor vehicle according to claim 1, wherein
the motor vehicle contains the third communication zone, which is coupled to the first communication zone via the monitoring device, the third communication zone having the memory to store secret data, the monitoring device permitting data access from the first communication zone to the third communication zone only with a valid authentication code, and
the monitoring device receives the valid authentication code from the vehicle-external appliance via the communication device.

7. The motor vehicle according to claim 1, wherein
the motor vehicle contains the third communication zone, which is coupled to the first communication zone via the monitoring device, the third communication zone having the memory to store secret data, the monitoring device permitting data access from the first communication zone to the third communication zone only with a valid authentication code, and
the monitoring device stipulates the valid authentication code using a transaction number (TAN) method.

8. The motor vehicle according to claim 1, wherein
the motor vehicle contains the third communication zone, which is coupled to the first communication zone via the monitoring device, the third communication zone having the memory to store secret data, the monitoring device permitting data access from the first communication zone to the third communication zone only with a valid authentication code, and
the monitoring device changes the valid authentication code after each use or after a particular period of time has elapsed.

9. The motor vehicle according to claim 1, wherein the motor vehicle stores the plurality of preinstalled, selectable characteristic maps and the monitoring device takes the new data as a basis for enabling and activating at least one of the preinstalled characteristic maps for use as vehicle control data in the motor vehicle.

10. The motor vehicle according to claim 1, wherein the monitoring device performs the simulation for the driving behavior that results from the new data and forwards the new data only if the simulation shows that the admissible driving behavior is obtained in accordance with the predetermined plausibility criterion.

11. The motor vehicle according to claim 1, wherein the motor vehicle contains the third communication zone, which is coupled to the first communication zone via the monitoring device, the third communication zone having the memory to store secret data, the monitoring device permitting data access from the first communication zone to the third communication zone only with a valid authentication code.

12. The motor vehicle according to claim 1, wherein
the application program which attempts to transmit the new data is an application program that is authorized to operate in the first communication zone, and
even though the application program is authorized to operate in the first communication zone, the monitoring device monitors the new data to recognize whether the new data result in the safe driving behavior.

13. A method for monitoring action in vehicle control data that stipulate a driving behavior for a motor vehicle, comprising:
monitoring, using a monitoring device, a connection between a first communication zone, in which an application program that provides new data for altering the vehicle control data is executed, and a second communication zone, in which the vehicle control data are stored in a memory device;
after recognizing an attempt to transmit the new data from the first communication zone to the second communication zone, checking the new data by the monitoring device for whether use of the new data as vehicle control data will result in a safe driving behavior for the motor vehicle that is defined by a safety criterion; and
permitting, by the monitoring device, transmission of the new data to the second communication zone only if the new data will result in the safe driving behavior,
wherein the method has at least one property selected from a group consisting of:
the motor vehicle stores a plurality of preinstalled, selectable characteristic maps and the monitoring device takes the new data as a basis for enabling and activating at least one of the preinstalled characteristic maps for use as vehicle control data in the motor vehicle,
the monitoring device performs a simulation for a driving behavior that results from the new data and forwards the new data only if the simulation shows that an admissible driving behavior is obtained in accordance with a predetermined plausibility criterion, and
the motor vehicle contains a third communication zone, which is coupled to the first communication zone via the monitoring device, the third communication zone having a memory to store secret data, the secret data being at least one of vehicle-related secret data and person-related secret data, the secret data being for at least one of an online payment and an online service, the monitoring device permitting data access from the first communication zone to the third communication zone only with a valid authentication code.

14. The method for monitoring action in vehicle control data according to claim 13, wherein
the monitoring device compares the new data with at least one framework characteristic map stored in the motor vehicle, and
the monitoring device blocks transmission of the new data if the new data, when used as vehicle control data, would result in a control value outside an admissible range defined by the at least one framework characteristic map.

* * * * *